(12) United States Patent
Hsu et al.

(10) Patent No.: US 12,381,954 B2
(45) Date of Patent: Aug. 5, 2025

(54) SMART CONTROL MODULE FOR COIN-OPERATED DEVICE

(71) Applicant: Chung-Hao Hsu, Taipei (TW)

(72) Inventors: Chung-Hao Hsu, Taipei (TW);
San-Feng Huang, Taipei (TW)

(73) Assignee: Chung-Hao Hsu, Taipei (TW)

( * ) Notice: Subject to any disclaimer, the term of this patent is extended or adjusted under 35 U.S.C. 154(b) by 0 days.

(21) Appl. No.: 18/394,921

(22) Filed: Dec. 22, 2023

(65) Prior Publication Data
US 2024/0214453 A1 Jun. 27, 2024

(30) Foreign Application Priority Data

Dec. 23, 2022 (TW) .................................. 111149636

(51) Int. Cl.
*H04L 67/125* (2022.01)
*G06Q 30/015* (2023.01)

(52) U.S. Cl.
CPC ......... *H04L 67/125* (2013.01); *G06Q 30/015* (2023.01)

(58) Field of Classification Search
CPC ............................ H04L 67/125; G06Q 30/015
See application file for complete search history.

(56) References Cited

U.S. PATENT DOCUMENTS

| | | | | |
|---|---|---|---|---|
| 9,652,922 B1* | 5/2017 | Schuck | ................... | G07F 11/36 |
| 2002/0034978 A1* | 3/2002 | Legge | ..................... | G07F 17/32 |
| | | | | 463/47 |
| 2003/0128829 A1* | 7/2003 | Hallman | ............. | H04M 17/026 |
| | | | | 379/144.06 |
| 2004/0220817 A1* | 11/2004 | Sanville | .................... | B60S 3/00 |
| | | | | 700/265 |
| 2006/0092434 A1* | 5/2006 | Koakutsu | ........... | H04N 1/00925 |
| | | | | 358/1.1 |
| 2006/0201775 A1* | 9/2006 | Tedesco | ................. | G06Q 20/04 |
| | | | | 194/302 |

(Continued)

FOREIGN PATENT DOCUMENTS

| | | |
|---|---|---|
| CN | 202443527 U | 9/2012 |
| CN | 108831063 A | 11/2018 |

(Continued)

*Primary Examiner* — Javier O Guzman
(74) *Attorney, Agent, or Firm* — Birch, Stewart, Kolasch & Birch, LLP (57) ABSTRACT

A smart control module for a coin-operated device includes a control board disposed with a processing unit, a back-end port, and a communication unit that are electrically connected to the processing unit. A front-end port is disposed on the control board and is adapted to receive a coin insertion signal outputted by a coin acceptor. The back-end port outputs the coin insertion signal in a bypassing way. When the communication unit receives a control signal from a service platform, the processing unit outputs a simulated coin insertion signal through the back-end port. Upon using the present invention, the front-end port and the back-end port are connected between the coin acceptor and a controller of the coin-operated device. The service platform could remotely control the back-end port to output the simulated coin insertion signal to the controller after receiving a malfunction reported by a user.

10 Claims, 4 Drawing Sheets

(56) References Cited

U.S. PATENT DOCUMENTS

| | | | | |
|---|---|---|---|---|
| 2009/0027722 | A1* | 1/2009 | Tsujimoto | H04N 1/00923 |
| | | | | 358/1.15 |
| 2014/0263385 | A1* | 9/2014 | Martin | B65H 3/24 |
| | | | | 221/232 |
| 2015/0228140 | A1 | 8/2015 | Martin | |
| 2015/0296373 | A1* | 10/2015 | Morejon | G07F 17/0014 |
| | | | | 455/419 |
| 2016/0117458 | A1* | 4/2016 | Hermans | G16H 10/65 |
| | | | | 705/2 |
| 2017/0140612 | A1* | 5/2017 | Moore | G07F 17/3225 |
| 2018/0089653 | A1* | 3/2018 | Merkh | G06Q 20/18 |
| 2018/0338241 | A1* | 11/2018 | Li | H04W 4/40 |
| 2020/0126041 | A1* | 4/2020 | Velusamy Sivasamy | |
| | | | | G06Q 10/103 |
| 2021/0108351 | A1* | 4/2021 | Patterson | D06F 31/00 |
| 2021/0248585 | A1* | 8/2021 | Kohno | G06Q 20/204 |
| 2024/0064226 | A1* | 2/2024 | Colston | H04W 68/005 |

FOREIGN PATENT DOCUMENTS

| | | |
|---|---|---|
| TW | M432102 U1 | 6/2012 |
| TW | 201308258 A | 2/2013 |

\* cited by examiner

SMART CONTROL MODULE FOR COIN-OPERATED DEVICE

BACKGROUND OF THE INVENTION

Technical Field

The present invention relates generally to a coin-operated device, and more particularly to a smart control module for a coin-operated device.

Description of Related Art

A conventional coin-operated device, such as a drink vending machine or a self-service car washing machine, generally provides a customer service hotline on or next to the coin-operated device for reporting malfunctions of the coin-operated device, for example a coin jam, that occur and are required to be eliminated. When a coin is inserted into a coin acceptor but is jammed, a user can call the customer service hotline for reporting the malfunctions to reach a customer service personnel of a coin-operated device manufacturer. At that time, the customer service personnel can arrange a maintenance personnel to the coin-operated device to repair and refund the user according to the malfunction complaint by the user, so that the user can smoothly use a service of the coin-operated device. After the user informs the customer service personnel of the coin-operated device manufacturer that the coin-operated device has a coin card problem or other faults, it often takes a while before the maintenance personnel comes.

However, after the user informing the coin jam or other malfunctions occurred in the coin-operated device to the customer service personnel of the coin-operated device manufacturer, it often takes a while before the maintenance personnel come. For example, when the coin jam occurs in the coin acceptor of the coin-operated self-service car washing machine, the user cannot use on-site working equipment, such as high-pressure water, car wash foam, car wash dryer, coating and waxing, etc., which not only causes inconveniences to the user, but also causes difficulties in the arrangement of the maintenance engineer of the coin-operated device manufacturer.

BRIEF SUMMARY OF THE INVENTION

In view of the above, the primary objective of the present invention is to provide a smart control module for a coin-operated device, wherein the smart control module is adapted to be connected between a coin acceptor and a controller of the coin-operated device, and output a simulated coin insertion signal to the controller after receiving a control signal of a network platform, so that the coin-operated device could provide a service required. In this way, the problem of a conventional coin-operated device that cannot provide a service upon a coin jam occurred in a coin acceptor could be solved, and the trouble that a service provider of the coin-operated device is required to immediately repair the coin-operated device could be relieved.

The present invention provides a smart control module for a coin-operated device, including a control board, at least one front-end port, at least one back-end port, a communication unit, and a processing unit. The at least one front-end port is disposed on the control board and is adapted to receive a coin insertion signal outputted by at least one coin acceptor. The at least one back-end port is disposed on the control board, is electrically connected to the at least one front-end port, and is adapted to output the coin insertion signal received by the at least one front-end port in a bypassing way. The communication unit is disposed on the control board, and is connected to a service platform located in an internet cloud. The processing unit is disposed on the control board, and is electrically connected to the communication unit and the at least one back-end port. When the communication unit receives a control signal from the service platform, the processing unit outputs a simulated coin insertion signal corresponding to the control signal through the at least one back-end port. The simulated coin insertion signal simulates the coin insertion signal received by the at least one front-end port.

Upon using the present invention, the smart control module of the present invention is mounted in a coin-operated device having at least one coin acceptor, wherein the at least one coin acceptor is electrically connected to the at least one front-end port. The coin-operated device has a controller, wherein the controller is changed from being electrically connected to the at least one coin acceptor to being electrically connected to the at least one back-end port. As the at least one back-end port could output the coin insertion signal received by the at least one front-end port in the bypassing way, the operating procedure of providing the services of the coin-operated device with the smart control module is the same as that of the coin-operated device without the smart control module, i.e., when the at least one coin acceptor normally operates, the controller receives the coin insertion signal outputted by different coin acceptors upon a coin insertion or outputted by the same coin acceptor upon different number of coin insertions; depending on which coin acceptor the coin insertion is performed on and the number of the coin insertion performed, or the sum of money calculated and the service selected on an input interface of the controller, the controller correspondingly controls one of the service modules of the coin-operated device to operate.

When a coin jam occurs in one of the coin acceptors of the coin-operated device, the user could contact the service platform by scanning a matrix two-dimensional barcode on the coin-operated device through a smart phone to connect to the website interface of the service platform or by calling a customer service hotline of the service platform through the smart phone. By doing so, the user could report the malfunction of the coin-operated device. At that time, the service platform could output the control signal, which corresponds to the service type required in the reporting process, to the communication unit according to the malfunction reported by the user, so that the smart control module of the present invention could bypass the jammed coin acceptor, and the processing unit could output the simulated coin insertion signal corresponding to the control signal through the at least one back-end port. When the controller receives the simulated coin insertion signal, the controller correspondingly controls the service modules to provide the service the user required according to the original operating procedure of the coin-operated device.

With the aforementioned design, since the smart control module of the present invention could output the simulated coin insertion signal when the coin jam occurs in the coin acceptor, the smart control module of the present invention could prevent the coin-operated device from complete service suspension due to the jammed coin acceptor, and the service provider of the coin-operated device could avoid arranging the maintenance personnel immediately to the coin-operated device to repair, so that the problem of a conventional coin-operated device that cannot provide a service upon a coin jam occurred in a coin acceptor could be solved. Additionally, as the service platform could remotely control the smart control module mounted in the coin-operated device to output the simulated coin insertion signal, which simulates the coin insertion signal outputted by the at least one coin acceptor, to the controller of the coin-operated device, the user could deposit money into the service platform, and the fee of the services could be deducted through the deposited amount, so that the service platform could controls the coin-operated device with the smart control module of the present invention to provide the service.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
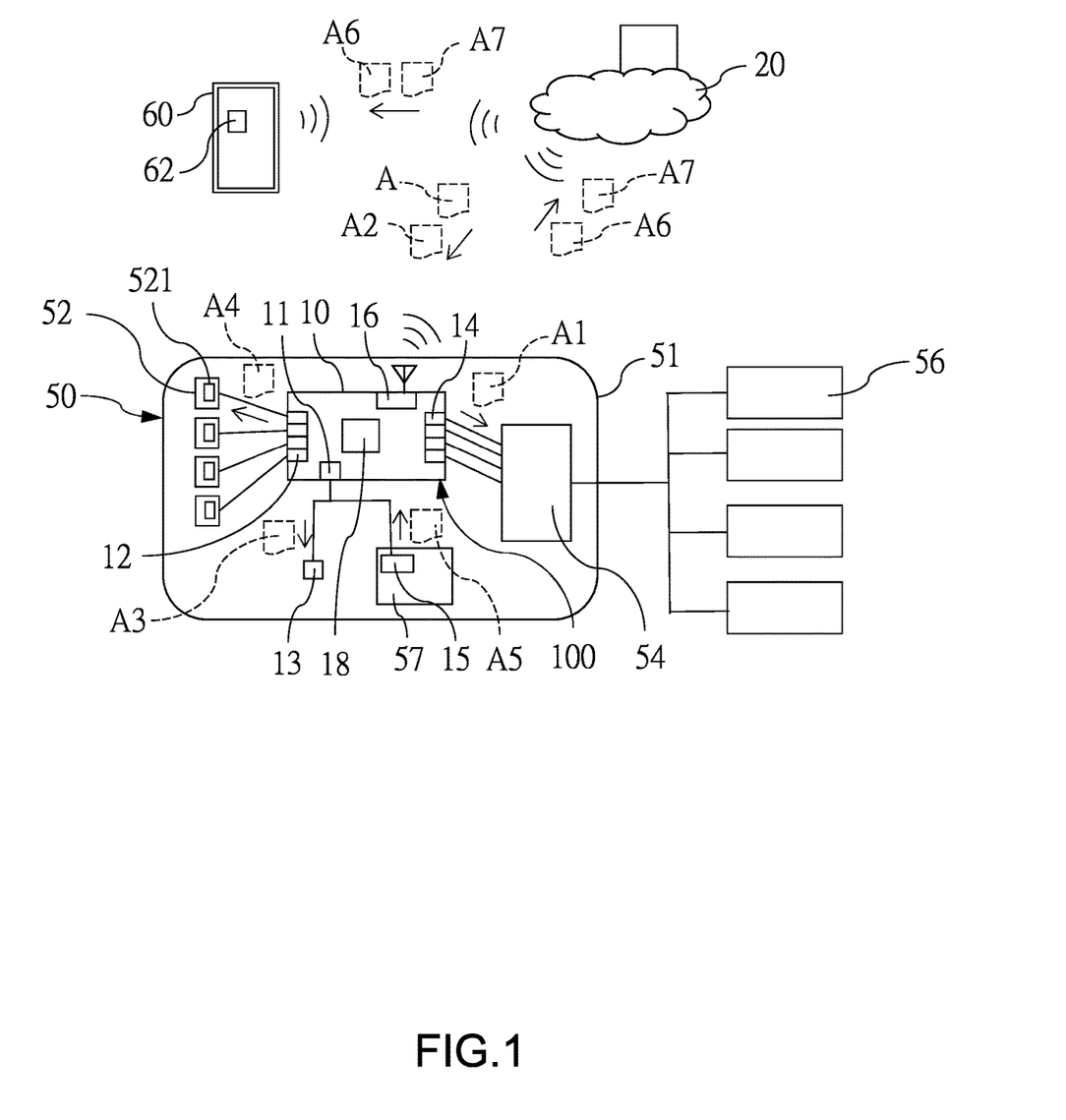
FIG. 1 is a schematic block diagram of the smart control module according to an embodiment of the present invention.

A smart control module 100 for a coin-operated device includes a control board 10, a plurality of front-end ports 12, a plurality of back-end ports 14, a communication unit 16, and a processing unit 18 that are respectively disposed on the control board 10.

The control board 10 is a printed circuit board.

Each of the front-end ports 12 is adapted to receive a coin insertion signal outputted by a coin acceptor.

Each of the back-end ports 14 is electrically connected to one of the front-end ports 12, and is adapted to output the coin insertion signal received by one of the front-end ports 12 in a bypassing way.

The communication unit 16 is a wired and/or wireless internet communication unit, and is connected to a service platform 20 located in an internet cloud through an internet.

The processing unit 18 is a microcontroller unit (MCU), and is electrically connected to the communication unit 16 and the back-end ports 14. When the communication unit 16 receives a control signal A from the service platform 20, the processing unit 18 outputs a simulated coin insertion signal A1 corresponding to the control signal A through the back-end ports 14, wherein the simulated coin insertion signal A1 simulates the coin insertion signal received by the front-end ports 12.

Figure 2:
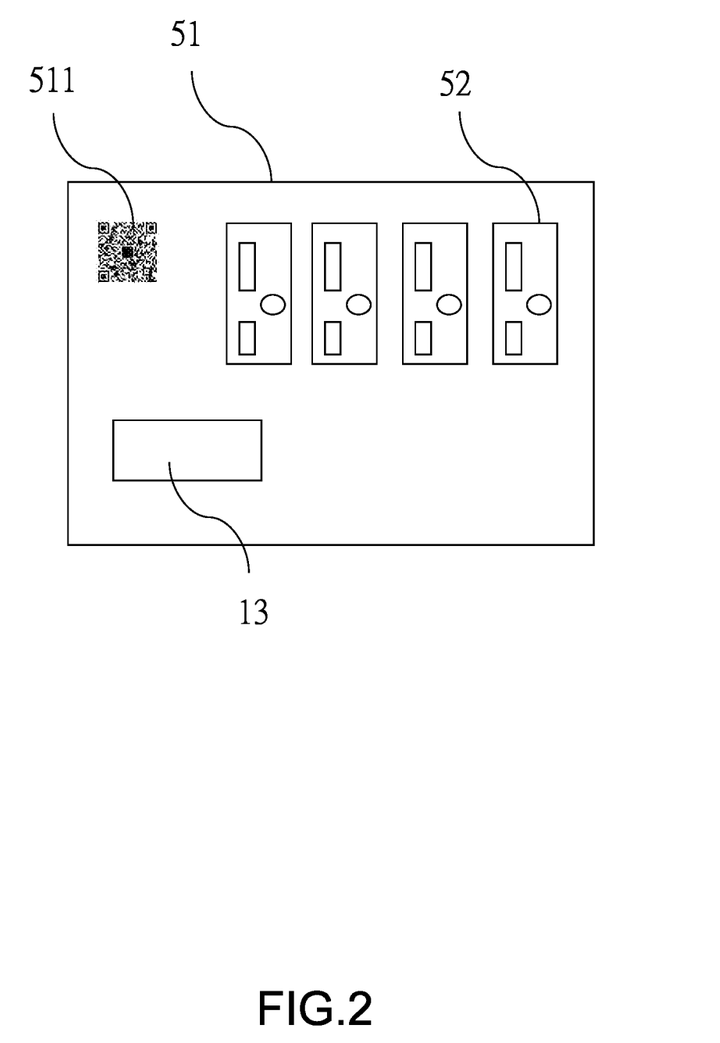
FIG. 2 is a schematic front view of the control box according to the embodiment of the present invention.

Referring to FIG. 1 and FIG. 2, the smart control module 100 of the present invention is mounted in a coin-operated device 50. In the current embodiment, the coin-operated device 50 is a coin-operated self-service car washing machine. The coin-operated device 50 has a control box 51, wherein a plurality of coin acceptors 52 is disposed on the control box 51, and respectively outputs the coin insertion signal upon a coin insertion. A controller 54 is mounted in the control box 51. When the coin-operated device 50 is not disposed with the smart control module 100 of the present invention, the controller 54 is electrically connected to the coin acceptors 52, and is adapted to receive the coin insertion signal outputted by the coin acceptors 52. A plurality of service modules 56 located out of the control box 51 is electrically connected to the controller 54, and is controlled by the controller 54, and respectively provides services of high-pressure water, car wash foam, car wash dryer, and coating and waxing. The controller 54 receives the coin insertion signal outputted by one of the coin acceptors 52 and correspondingly activates one of the service modules 56 to operate. Additionally, the coin insertion could be performed multiple times on the same coin acceptor 52 to make the coin acceptor 52 output the coin insertion signal multiple times, then the controller 54 could count the number of the coin insertion signals received to increase a service time of the corresponding service module 56.

When the smart control module 100 of the present invention is mounted in the coin-operated device 50, each of the coin acceptors 52 is electrically connected to one of the front-end ports 12, and the controller 54 changed from being electrically connected to the coin acceptors 52 to being electrically connected to the back-end ports 14.

As each of the back-end ports 14 could bypass the coin insertion signal received by one of the front-end ports 12, the operating procedure of providing the services of the coin-operated device 50 with the smart control module 100 is the same as that of the coin-operated device 50 without the smart control module 100, i.e., when the coin acceptors 52 of the coin-operated device 50 normally operates, the controller 54 receives the coin insertion signal outputted by each of the coin acceptors 52, and correspondingly controls one of the service modules 56 to operate. In view of the above, the smart control module 100 is mounted in the coin-operated device 50 without changing the original operating procedure and function of the coin-operated device 50, wherein the smart control module 100 is simply connected between the coin acceptors 52 and the controller 54 during installation, and such configuration allows the smart control module 100 to be suitable for being mounted in different types of coin-operated device 50.

When coins are unknowingly inserted into one of the coin acceptors 52 of the coin-operated device 50 that is jammed and unable to dispense or return coins or output the coin insertion signal, the user could contact the service platform 20 by connecting to the website interface provided by the service platform 20 or by calling a customer service hotline of the service platform 20 through a smart phone. By doing so, the user could report the malfunction occurred in the coin-operated device 50 to a customer service personnel of the service platform 20 by text or voice and explain what service type the service module 56 corresponding to the jammed coin acceptor 52 is or what service type the user requires.

Then, the service platform 20 could output the control signal A, which corresponds to the service type required in the reporting process, to the communication unit 16 of the smart control module 100 according to the malfunction reported by the user, wherein the control signal A could correspond to, for example, the car wash foam service. When the communication unit 16 receives the control signal A, the processing unit 18 outputs the simulated coin insertion signal A1 corresponding to the control signal A through the back-end ports 14. The simulated coin insertion signal A1 is the same as the coin insertion signal outputted by the coin acceptor 52 corresponding to the car wash foam service upon the coin insertion, so that when the controller 54 receives the simulated coin insertion signal A1, the controller 54 controls one of the service modules 56 of the coin-operated device 50 corresponding to the car wash foam service to provide the car wash foam service according to the original operating procedure of the coin-operated device 50.

Apart from the aforementioned embodiment, in which the plurality of front-end ports 12 and the plurality of back-end ports 14 are disposed on the control board 10, and each of the front-end ports 12 is electrically connected to one of the coin acceptors 52 of the coin-operated device 50, in another embodiment, the control board 10 could be disposed with only one front-end port 12 and only one back-end port 14.

Figure 3:
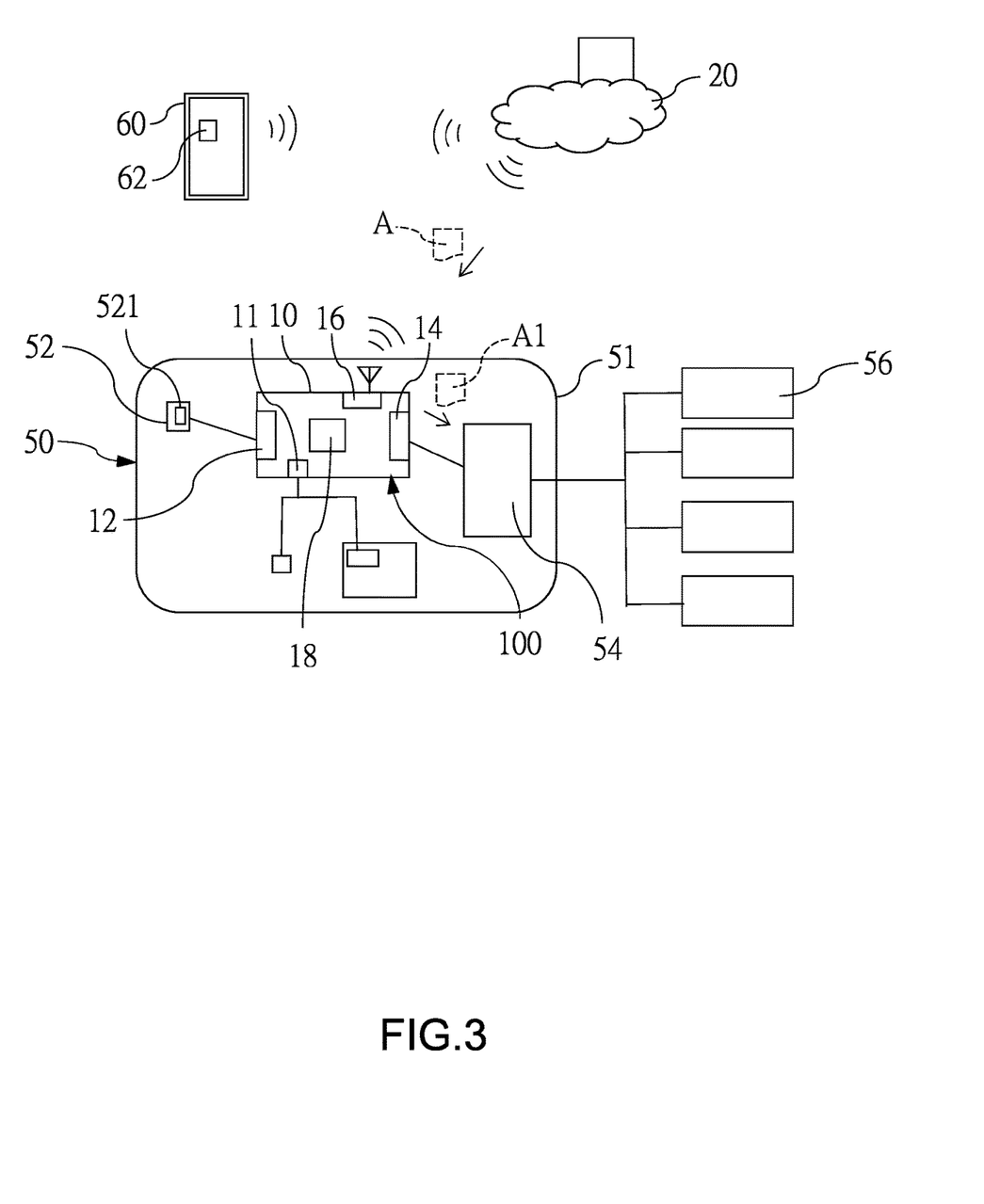
FIG. 3 is a schematic block diagram of the smart control module according to another embodiment of the present invention.
Figure 4:
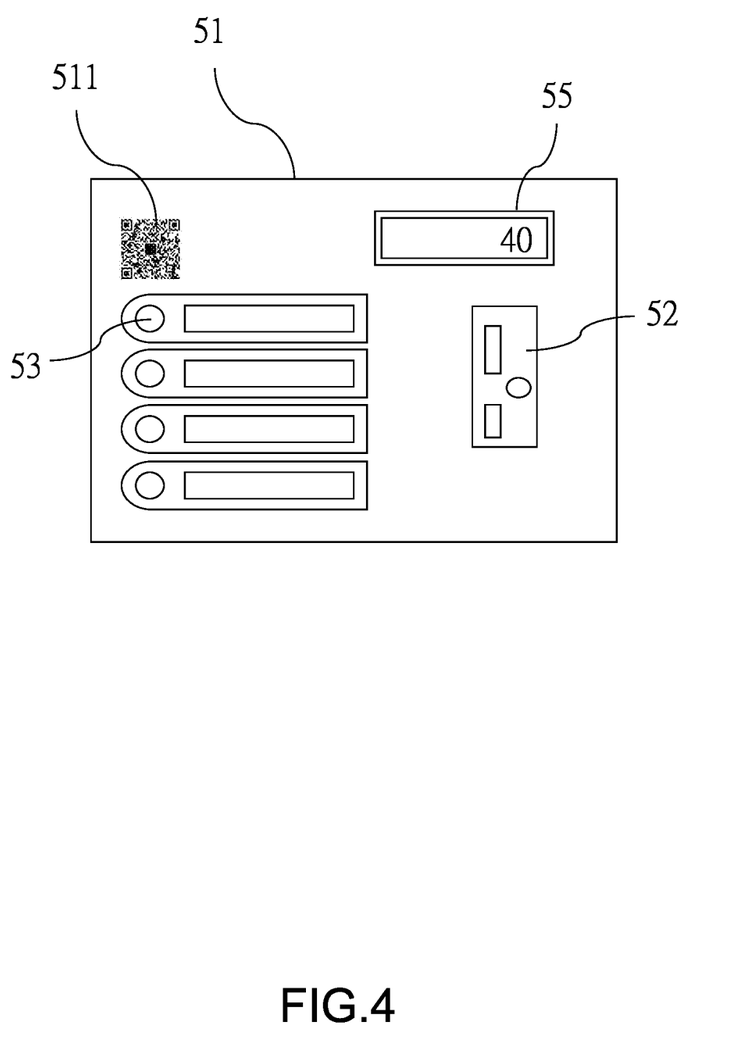
FIG. 4 is a schematic front view of the control box according to the another embodiment of the present invention.

Referring to FIG. 3 and FIG. 4, in the another embodiment, the smart control module 100 is mounted in a coin-operated device 50 having only one coin acceptor 52. A control box 51 of the coin-operated device 50 has a plurality of function buttons 53 respectively and electrically connected to the controller 54 and a display 55. Each of the function buttons 53 is electrically connected to the controller 54 and is adapted to control the controller 54 to activate one of the service modules 56. The front-end port 12 is electrically connected to the coin acceptor 52 of the coin-operated device 50. When the controller 54 receives the coin insertion signal bypassed from the back-end port 14, the controller 54 calculates a sum of money inserted by counting the number of the coin insertion signal received and displays the sum of money on the display 55, and then a user could press one of the function buttons 53 to correspondingly deduct an amount of money for a corresponding service and correspondingly activate the service module 56 of the service to operate. For example, when the coin insertion is performed four times on the coin acceptor 52 adapted to accept 10-dollar coins, the sum of 40 dollars would be displayed on the display 55, wherein the controller 54 is preset to activate the service module 56 of the car wash foam service for 10 minutes per 20 dollars; when the user presses the function button 53 corresponding to the car wash foam service two times, the service module 56 of the car wash foam service could be activated to provide the service for 20 minutes.

In the another embodiment, when the user contacts the service platform 20 to report a malfunction due to the coin jam after performing the coin insertion on the coin acceptor 52 four times, the service platform 20 could correspondingly output the control signal A to the communication unit 16 of the smart control module 100 according to the coin jam malfunction reported, and the processing unit 18 outputs the simulated coin insertion signal A1 corresponding to the control signal A through the back-end port 14. In the current example, the simulated coin insertion signal A1 is a coin insertion signal simulating the four-time coin insertion. When the controller 54 receives the simulated coin insertion signal A1, the controller 54 displays the sum of 40 dollars on the display 55. At that time, the user could press the function button 53 corresponding to the car wash foam service two times to activate the service module 56 of the car wash foam service to provide car wash foam for 20 minutes, or could press the other function buttons 53 to activate the other service modules 56, for example, high-pressure water, car wash dryer, or coating and waxing.

In the aforementioned embodiments, the malfunction is reported by the smart phone connected to the website provided by the service platform 20. More specifically, a matrix two-dimensional barcode 511 including the website of the service platform 20 is provided on a surface of the control box 51 by printing or a sticker. The smart phone is connected to the service platform 20 through an internet by running a platform application 62 to scan the matrix two-dimensional barcode 511, so that the malfunction could be reported in text or voice. The service platform 20 correspondingly outputs the control signal A to the communication unit 16 according to the malfunction reported, then the processing unit 18 outputs the simulated coin insertion signal A1 corresponding to the malfunction reported through the at least one back-end port 14, so that the coin-operated device 50 could provide the service or display the sum of money available for deduction for the service.

The smart control module 100 of the present invention could output the simulated coin insertion signal A1 when the coin jam occurs in the coin acceptor 52, so that the smart control module 100 of the present invention could prevent the coin-operated device 50 from complete service suspension due to the jammed coin acceptor 52, thereby relieving difficulties of the service provider in arranging a maintenance personnel as the coin-operated device 50 does not require to be immediately repaired when the coin acceptor 52 is jammed. In another aspect, as the service platform 20 could remotely control the smart control module 100 mounted in the coin-operated device 50 to output the simulated coin insertion signal A1 to the controller 54, a mechanism for the user to deposit money into the service platform 20 could be enabled, and the user could deposit money into the service platform 20 through the platform application 62 in the smart phone 60; then, when the user needs to use the services, the smart phone 60 could be connected to the service platform 20, and the fee of the services could be deducted through the deposited amount, so that the service platform 20 controls the coin-operated device 50 with the smart control module 100 to provide the services or display the amount of money available for service deduction.

Referring to FIG. 1 and FIG. 2, in the embodiment, a communication port 11 is further disposed on the control board 10 and is electrically connected to the processing unit 18. An alarming member 13 is disposed on the control box 51 for alarming that the coin-operated device 50 is jammed and the coin insertion is prohibited. The alarming member 13 is electrically connected to the communication port 11. Each of the coin acceptors 52 of the coin-operated device 50 has an electric coin return mechanism 521 adapted to automatically return coins through the coin acceptor 52 upon being activated. The electric coin return mechanism 521 of each of the coin acceptor 52 is electrically connected to one of the front-end ports 12, and the processing unit 18 is electrically connected to the front-end ports 12, so that the processing unit 18 could control the electric coin return mechanism 521 of each of the coin acceptors 52 to activate or turn off.

In the embodiment, the service platform 20 outputs a service suspension signal A2 to the communication unit 16 of the smart control module 100 after the user reports the malfunction in the service platform 20, for example, the user finds that one of the service modules 56 malfunctions, or the controller 54 malfunctions and the coin-operated device 50 does not normally provide the services. When the communication unit 16 receives the service suspension signal A2 from the service platform 20, the processing unit 18 outputs an alarming signal A3 through the communication port 11, and outputs a coin return signal A4 to the coin return mechanism 521 of each of the coin acceptors 52 through one of the front-end ports 12. The alarming member 13 outputs a service suspension alarm with light or sound upon receiving the alarming signal A3, preventing the user from inserting coins into the coin acceptors 52. The coin return mechanism 521 of each of the coin acceptors 52 is activated as a coin return state upon receiving the coin return signal A4, wherein when a coin is accidentally inserted into one of the coin acceptors 52 while the coin-operated device 50 is in service suspension, the coin inserted could be automatically returned through a coin return slot of the coin acceptors 52.

Referring to FIG. 1 and FIG. 2, in the embodiment, the smart control module 100 further provides a design to facilitate the management of the coin-operated device 50. The coin-operated device 50 has a coin box 57, wherein a weight limit of the coin box 57 is preset in the processing unit 18. A weight sensor 15 is electrically connected to the communication port 11, is disposed on the coin box 57, and is adapted to detect a weight of the coin box 57 and output a weight signal A5. The processing unit 18 receives the weight signal A5 and compares the weight signal A5 with the weight limit; when the weight signal A5 is greater than the weight limit, the processing unit 18 outputs a fully loaded signal A6 to the service platform 20 through the communication unit 16, so that when the smart phone 60 is connected to the service platform 20 by running the platform application 62, the smart phone 60 could receive the fully loaded signal A6 indicating that the coin box is full from the service platform 20 or be notified by the service platform 20 that the coin box 57 is full, so that the user could be notified that the user needs to go to the coin-operated device 50 to collect the coins.

The processing unit 18 is electrically connected to the aforementioned at least one front-end port 12, so that the processing unit 18 could count the number of coin insertion signal received by the at least one front-end port 12 to calculate a coin insertion amount A7, wherein the processing unit 18 outputs the coin insertion amount A7 through the communication unit 16 to the service platform 20; when the smart phone 60 is connected to the service platform 20 by running the platform application 62, the smart phone 60 receives an information of the coin insertion amount A7 from the service platform 20. In this way, when the user receives the fully loaded signal A6 or is notified by the service platform 20 that the coin box 57 is full and arranges someone to go to the coin box 57 for collecting the coins, the user could determine whether the amount of the collected coins is correct by comparing the collected coins with the information of the coin insertion amount A7. Additionally, when the coin insertion amount A7 received by the service platform 20 reaches a predetermined amount, for example an amount upon the coin box 57 being full, the service platform 20 could notify the connected smart phone 60 that the coin box 57 is full, so that the user could be notified to go to the coin-operated device 50 for collecting the coins.

It must be pointed out that the embodiments described above are only some preferred embodiments of the present invention. All equivalent structures which employ the concepts disclosed in this specification and the appended claims should fall within the scope of the present invention.

What is claimed is:

1. A smart control module for a coin-operated device, comprising:
    a control board;
    at least one front-end port disposed on the control board, and adapted to receive a coin insertion signal outputted by at least one coin acceptor;
    at least one back-end port disposed on the control board, electrically connected to the at least one front-end port, and adapted to output the coin insertion signal received by the at least one front-end port in a bypassing way;
    a communication unit disposed on the control board and being connected to a service platform located in an internet cloud; and
    a processing unit disposed on the control board and electrically connected to the communication unit and the at least one back-end port, wherein when the communication unit receives a control signal from the service platform, the processing unit outputs a simulated coin insertion signal corresponding to the control signal through the at least one back-end port; the simulated coin insertion signal simulates the coin insertion signal received by the at least one front-end port;
    wherein a smart phone is connected to the service platform through an internet to report a malfunction by running a platform application to scan a matrix two-dimensional barcode; the service platform outputs the control signal corresponding to the malfunction reported to the communication unit, and the processing unit outputs the simulated coin insertion signal, which corresponds to the malfunction reported, through the at least one back-end port.

2. The smart control module as claimed in claim 1, wherein a communication port is disposed on the control board and is electrically connected to the processing unit; the smart control module further comprises an alarming member electrically connected to the communication port; when the communication unit receives a service suspension signal from the service platform, the processing unit outputs an alarming signal through the communication port; the alarming member outputs an alarm with light or sound upon receiving the alarming signal.

3. The smart control module as claimed in claim 2, wherein the at least one front-end port is electrically connected to at least one electric coin return mechanism; the processing unit is electrically connected to the at least one front-end port; when the communication unit receives the service suspension signal from the service platform, the processing unit outputs a coin return signal through the at least one front-end port; the at least one electric coin return mechanism is activated as a coin return state upon receiving the coin return signal.

4. The smart control module as claimed in claim 1, wherein a communication port is disposed on the control board and is electrically connected to the processing unit; a weight limit is preset in the processing unit; the smart control modules further comprises a weight sensor electrically connected to the communication port, and adapted to detect a weight of a coin box of the coin-operated device and output a weight signal; the processing unit receives the weight signal and compares the weight signal with the weight limit; when the weight signal is greater than the weight limit, the processing unit outputs a fully loaded signal to the service platform through the communication unit.

5. The smart control module as claimed in claim 4, wherein the smart phone is connected to the service platform through the internet by running the platform application to scan the matrix two-dimensional barcode; the platform application receives the fully loaded signal from the service platform.

6. The smart control module as claimed in claim 1, wherein the processing unit is electrically connected to the at least one front-end port, and counts a number of the coin insertion signal received by the at least one front-end port to calculate a coin insertion amount; the processing unit outputs the coin insertion amount through the communication unit to the service platform.

7. The smart control module as claimed in claim 6, wherein the smart phone is connected to the service platform through the internet by running the platform application to scan the matrix two-dimensional barcode; the platform application receives an information of the coin insertion amount from the service platform.

8. A smart control module for a coin-operated device, comprising:
- a control board;
- at least one front-end port disposed on the control board, and adapted to receive a coin insertion signal outputted by at least one coin acceptor;
- at least one back-end port disposed on the control board, electrically connected to the at least one front-end port, and adapted to output the coin insertion signal received by the at least one front-end port in a bypassing way;
- a communication unit disposed on the control board and being connected to a service platform located in an internet cloud; and
- a processing unit disposed on the control board and electrically connected to the communication unit and the at least one back-end port, wherein when the communication unit receives a control signal from the service platform, the processing unit outputs a simulated coin insertion signal corresponding to the control signal through the at least one back-end port; the simulated coin insertion signal simulates the coin insertion signal received by the at least one front-end port;
- wherein a malfunction is reported to the service platform by calling a customer service hotline via a smart phone; the service platform correspondingly outputs the control signal to the communication unit according to the malfunction reported, and the processing unit outputs the simulated coin insertion signal, which corresponds to the malfunction reported, through the at least one back-end port.

9. The smart control module as claimed in claim 2, wherein when the smart phone is connected to the service platform through the internet by running the platform application to scan the matrix two-dimensional barcode and the malfunction is reported by the smart phone, the service platform outputs the service suspension signal to the communication unit.

10. The smart control module as claimed in claim 3, wherein when the smart phone is connected to the service platform through the internet by running the platform application to scan the matrix two-dimensional barcode and the malfunction is reported by the smart phone, the service platform outputs the service suspension signal to the communication unit.

\* \* \* \* \*